United States Patent
Sundaresan et al.

(10) Patent No.: US 9,078,072 B2
(45) Date of Patent: Jul. 7, 2015

(54) AUDIO DISTRIBUTION

(71) Applicants: Rameshwar Sundaresan, Shrewsbury, MA (US); Gerald W. Eaton, Arlington, MA (US)

(72) Inventors: Rameshwar Sundaresan, Shrewsbury, MA (US); Gerald W. Eaton, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/047,857

(22) Filed: Oct. 7, 2013

(65) Prior Publication Data

US 2015/0098576 A1    Apr. 9, 2015

(51) Int. Cl.
*H04R 29/00* (2006.01)
*H04L 12/26* (2006.01)

(52) U.S. Cl.
CPC ............ *H04R 29/00* (2013.01); *H04L 43/0894* (2013.01); *H04L 43/0829* (2013.01); *H04L 43/062* (2013.01); *H04R 2420/07* (2013.01)

(58) Field of Classification Search
CPC ... G06F 3/16; G06F 17/3074; H04L 65/4076; H04L 43/0829; H04L 43/062; H04L 43/0894; H04R 3/12; H04R 2227/005; H04R 2420/07; H04R 29/00; H04W 84/20; H04W 72/08; H04W 72/085; H04W 72/087
USPC .......... 381/58, 77, 79, 80, 81, 82, 85; 700/94; 709/208, 209
See application file for complete search history.

(56) References Cited

U.S. PATENT DOCUMENTS

| | | | |
|---|---|---|---|
| 7,359,950 B2* | 4/2008 | Choi et al. .................... 709/209 |
| 7,369,549 B2* | 5/2008 | Wu et al. ........................ 370/389 |
| 7,643,894 B2* | 1/2010 | Braithwaite et al. ............. 700/94 |
| 8,214,447 B2* | 7/2012 | Deslippe et al. ............... 709/208 |
| 8,234,395 B2* | 7/2012 | Millington .................... 709/231 |
| 8,843,228 B2* | 9/2014 | Lambourne ..................... 700/94 |
| 2005/0262216 A1* | 11/2005 | Kashiwabara et al. ....... 709/208 |
| 2006/0149850 A1 | 7/2006 | Bowman |
| 2009/0190582 A1 | 7/2009 | Nambiath et al. |
| 2012/0303705 A1 | 11/2012 | Park et al. |

FOREIGN PATENT DOCUMENTS

WO    2008046143 A1    4/2008

OTHER PUBLICATIONS

The International Search Report and the Written Opinion of the International Searching Authority mailed on Dec. 23, 2014 for corresponding PCT Application No. PCT/US2014/058947.

* cited by examiner

*Primary Examiner* — Vivian Chin
*Assistant Examiner* — Jason R Kurr
(74) *Attorney, Agent, or Firm* — Brian M. Dingman; Dingman, McInnes + McLane, LLP

(57) ABSTRACT

A method and device for distributing audio data to a number of audio playback devices that are connected to a network. One or more network-related performance criteria of a plurality of the audio playback devices are compared. Based on the comparison, at least one of the audio playback devices is designated as a master device and at least one other of the audio playback devices is designated as a slave device. The master device then controls the distribution of audio data to one or more of the slave devices.

18 Claims, 4 Drawing Sheets

AUDIO DISTRIBUTION

BACKGROUND

This disclosure relates to the distribution of audio data over a network.

Audio systems can be arranged to stream digital audio data to one or more of multiple audio playback devices that are connected to a network such as a local area network (LAN). Each audio playback device is able to play the audio data through one or more loudspeakers. In some such networked audio systems a master device receives the audio data from an audio source and manages the distribution of the data over the network to the other audio devices, which are considered slaves that receive and then play the audio that is served by the master.

SUMMARY

A master audio playback device is the gateway for streaming digital audio to multiple networked playback devices. In wireless networks the link speeds of the different audio playback devices can vary significantly. In systems with a dedicated master device, if the link speed of the master is slow, or if it degrades over time, the performance of the entire network may degrade. Since interruptions in the continuous delivery and playback of audio data are problematic to users, master device link speed degradation is an important issue.

Any effect of link speed degradation on the performance of the master device can be lessened by selecting as the master playback device the playback device that has the greatest rate of successful transmission of audio data. Also, in networks with multiple playback devices playing the same streamed audio data, with the master servicing multiple slave devices, the master's link speed can slow considerably. In such cases acceptable data delivery speeds can be maintained by designating two or more audio playback devices as master devices, and associating each master with a manageably-sized group of slaves.

All examples and features mentioned below can be combined in any technically possible way.

In one aspect, a method for distributing audio data to multiple audio playback devices that are connected to a network includes comparing one or more network-related performance criteria of a plurality of the audio playback devices, and based on the comparison designating at least one of the plurality of audio playback devices as a master device and at least one other of the plurality of audio playback devices as a slave device, where the master device controls the distribution of audio data to one or more of the slave devices.

Embodiments may include one of the following features, or any combination thereof. The network-related performance criteria may comprise the successful data transfer rates of the plurality of the audio playback devices. The successful data transfer rate may comprise the network throughput achieved by an audio playback device. The successful data transfer rate may be determined based on the physical data rate modified by the packet error rate. The successful data transfer rate may be determined in part based on the data transmission error rate. The successful data transfer rate may be determined in part based on the standard deviation of the data transmission error rate. The comparison may be based at least in part on the successful data communication rates over a predetermined time period. The data communication rate may comprise the running average of the successful data transfer rate achieved by an audio playback device over the predetermined time period.

Embodiments may include one of the following additional features, or any combination thereof. The audio data may originate from an audio source, and the method may further comprise establishing a data connection between the master device and the audio source, and establishing data connections between the master device and the one or more slave devices. Each audio playback device may comprise a computer memory, and method may further comprise storing in the memory of each audio playback device an identification of the master device and each slave device.

Embodiments may include one of the following features, or any combination thereof. The method may further comprise monitoring a performance criterion of the master device and in response designating a slave device as a second master device that controls the distribution of audio data to one or more other slave devices. The method may further comprise, after designating a slave device as a second master device, establishing data connections between the one or more slave devices and the master devices, where each slave device is connected to only one master device. Monitoring a performance criterion of the master device may comprise determining the successful data communication rate achieved by the master device. The successful data communication rate may be determined based on the physical data rate modified by the packet error rate.

In another aspect, a computer device configured to control the distribution of audio data to audio playback devices that are connected to a network includes a memory, and a processor communicatively coupled to the memory and that is configured to compare one or more network-related performance criteria of a plurality of the audio playback devices, and based on the comparison designate one of the plurality of audio playback devices as a master device and at least one other of the plurality of audio playback devices as a slave device. The master device controls the distribution of audio data to one or more of the slave devices. The processor also causes an identification of the master device and the slave devices to be stored in the memory.

Embodiments may include one of the following features, or any combination thereof. The network-related performance criteria may comprise the successful data communication rates of the plurality of the audio playback devices. The successful data communication rate may comprise the network throughput achieved by an audio playback device. The successful data communication rate may comprise the running average of the successful data communication rate achieved by an audio playback device over the predetermined time period. The processor may further be configured to monitor a performance criterion of the master device and in response designate a slave device as a second master device that controls the distribution of audio data to one or more other slaves devices. The processor may be further configured to, after designating a slave device as a second master device, establish data connections between the one or more slave devices and the master devices, where each slave device is connected to only one master device.

DETAILED DESCRIPTION

An audio distribution system that has a number of audio playback devices can be dynamically configured such that one of the devices acts as a master device and controls the distribution of audio data to other audio playback devices, which are considered slave devices. When the audio playback devices are part of a network, the determination of which device is designated as the master device can be based on an analysis of the network-based performance of all of the active audio playback devices on the network. One measure of network-based performance is the network throughput accomplished by the device, the measure of which can be based on the physical data rate of the device modified by the packet error rate.

Figure 1:
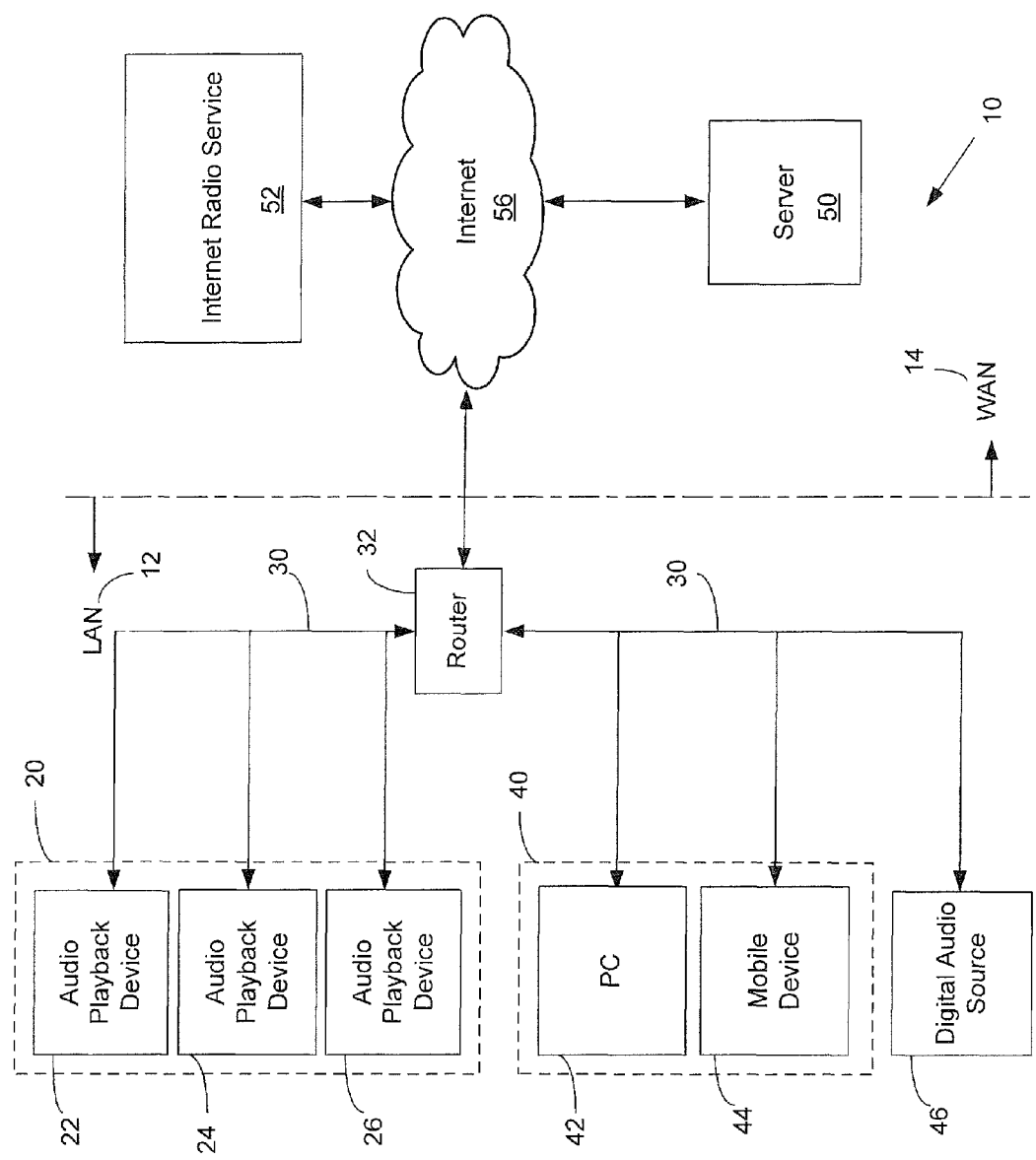
FIG. 1 is a schematic block diagram of an audio distribution system that facilitates maintenance of an acceptable audio distribution rate among a number of audio playback devices.

Audio distribution system 10, FIG. 1, can be used to accomplish a method for distributing audio data to audio playback devices that are connected to a network, and also includes the computer devices that are involved in the subject audio distribution. System 10 is adapted to deliver digital audio (e.g., digital music). System 10 includes a number of audio playback devices 22, 24 and 26 which are among the group of audio output devices 20 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 32 via network 30. The audio playback devices are thus able to communicate with one another. Network 30 can be a wired and/or wireless network, and can use known network connectivity methodologies. Network 30 is part of LAN 12 which is connected to wide area network (WAN) 14, in this non-limiting example by connection to Internet 56. LAN 12 also includes one or more separate computing devices 40 and one or more separate local digital audio sources 46. In this non-limiting example the computing devices include a personal computer 42 and a mobile computing device 44 such as a smart phone, tablet or the like. WAN 14 includes server 50 and Internet radio service 52 which can both communicate with the LAN via Internet 56.

One use of system 10 is to play an audio stream over one or more of the audio playback devices in group 20. The sources of digital audio provide access to content such as audio streams that move over network 30 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile computing device, can also be sources of audio data. Typically, the user selects the audio source and the playback devices via PC 42 and/or mobile device 44.

When a user has chosen to have an audio stream played on more than one of the audio playback devices, in order for the music to be properly synchronized such that the same tracks are playing synchronously on all of the audio playback devices there needs to be appropriate and sufficient coordination among all of the audio playback devices. One manner in which such coordination can be accomplished is to use one of the audio playback devices to control the distribution of audio data to all of the other audio playback devices that are being used to play content. This device which controls audio data distribution to the other active playback devices can be considered a master device, and the rest of the active devices (i.e., the rest of the playback devices that are being used to play content) can be considered to be slave devices.

In audio distribution systems with a dedicated master device, if the network data link rate of the master device degrades the performance of all of the audio playback devices will degrade accordingly. Such potential performance degradation can be reduced by dynamically selecting the master device based on one or more relevant network performance criteria of all of the active audio playback devices. For example, the network performance criterion can be a network data communication rate. If the audio playback device with the greatest successful data communication rate is selected as the master device, the performance of the network will remain at its highest possible level given the network configuration and performance.

Since all of the audio playback devices 22, 24 and 26 have the same functionality, each of them can act as the master device. One non-limiting manner in which the system can dynamically determine which device will take on the functionality of the master is as follows. Each of the audio playback devices would determine its level of one or more network-related performance criteria which are relevant to its functionality as a master device. When the audio playback devices have the same hardware and firmware, a relevant performance criterion is the rate of successful data transfer on network 30 accomplished by the device, which can be determined based on the data link rate or bit rate (i.e., the number of bits conveyed per unit of time) modified by the rate of data loss on the network. In one non-limiting example the performance metric is the rate of successful data transmission determined based on the following formula: (physical data rate)* (1—packet error rate). Other known means of determining a network performance criterion can alternatively be used.

Figure 2:
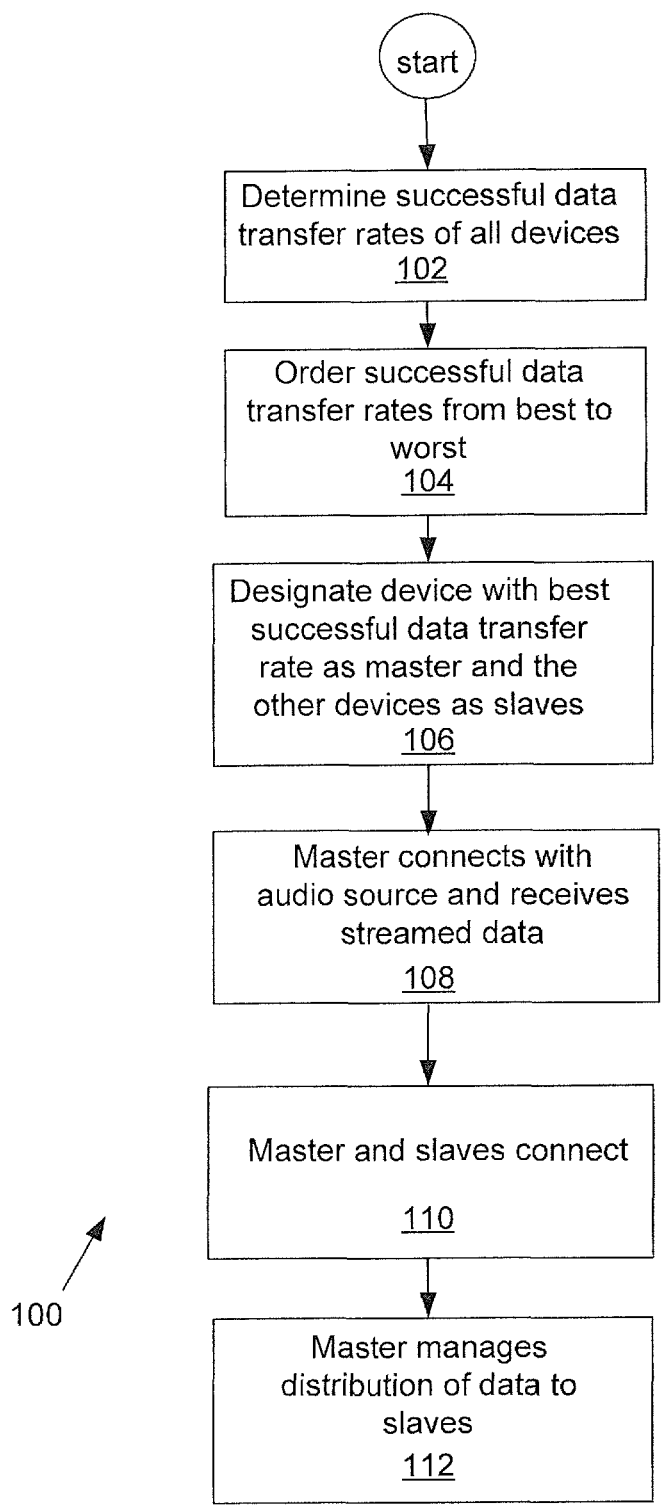
FIG. 2 illustrates a methodology for accomplishing efficient delivery of audio data to a number of audio playback devices.

A methodology for accomplishing efficient delivery of audio data to a number of audio playback devices is illustrated by methodology 100, FIG. 2. The first step 102 is to determine the successful data transfer rate of all of the audio playback devices that have been selected to play audio (i.e., the active devices). The measurement of successful data transfer rate (or other network performance criterion) is accomplished by each audio playback device individually. However, the criterion could be determined in other ways, for example under control of software resident in personal computer 42, or software resident in server 50. In one example, each of the active audio playback devices is adapted to measure its performance metric. The measurement of successful data transfer rate can be conducted essentially continuously as the device is operated, and the measurement can be saved in an appropriate manner; each audio playback device has a processor and associated memory, and the processor can be used to monitor this and store appropriate data in the local device memory. In this manner it is possible to consider the successful data transfer rate both instantaneously and as it has developed over time.

In most cases, once a master device is designated that designation won't change while the devices are in use playing streamed audio. However, as described below the designation of the master device may dynamically change while the system is in use. Since instantaneous successful data transfer speeds may vary over the time that the device is used to play audio, an instantaneous measure may not be the best measure on which to determine the device that will most successfully function as a master. In a general sense, it would be best to designate the master as the device that had a consistently good successful network speed (e.g., network throughput) for a long period of time, and during which at no time was the device's data transfer interrupted for any reason. One manner of measuring the speed in this manner would be to take the running average over a period of time or moving "window" in time. In one non-limiting example, this window can be from about 5 minutes up to about 2 hours. The devices can be configured to look at both the successful data transfer rate and its standard deviation over this predetermined time period. The devices can also be configured to find and store excursions or outliers such as data transfer failures, and then modify the running average based on such outliers. For example, if the successful data transfer rate of the device is generally very good but periodically suffers drastically such that the device would not be able to successfully manage audio data distribution to slave devices, it would be unwise to select that device as the master device.

Once the successful data transfer rates of all the active devices have been determined based on the predetermined criterion or criteria such as described above, the successful data transfer rates are essentially ordered from best to worst, step 104. Since the active devices are in communication over network 30, each device can maintain in its local memory the successful data transfer rates of all of the active devices. The device with the best successful data transfer rate is then designated as the master device and all of the other devices are designated as slave devices, step 106. The master would communicate this status to the slaves, which would acknowledge their status to the other devices. Once the master/slave relationships have been established, audio data streaming to all of the audio playback devices is accomplished by connecting the master to the audio source such that it receives streamed data, step 108. The master and slaves then connect over the network, step 110. This can be accomplished by having the slaves connect a data socket to the master. The network is now configured to distribute streamed audio data to each of the active audio playback devices.

The master manages distribution of data to the slaves, step 112. This management can be accomplished in a manner that is known in the networking field. For example, the master device can push the audio data it has received to the slave devices, or the master can make the audio data available for the slave devices to retrieve. The audio data can be delivered in packets. The packets can be time stamped so that each of the devices can play the data in the proper order and at the proper time such that the audio outputs of the devices are synchronized. As a result, for example in a home network where there are audio playback devices in several rooms, the same music will be playing in all of the rooms.

Figure 3:
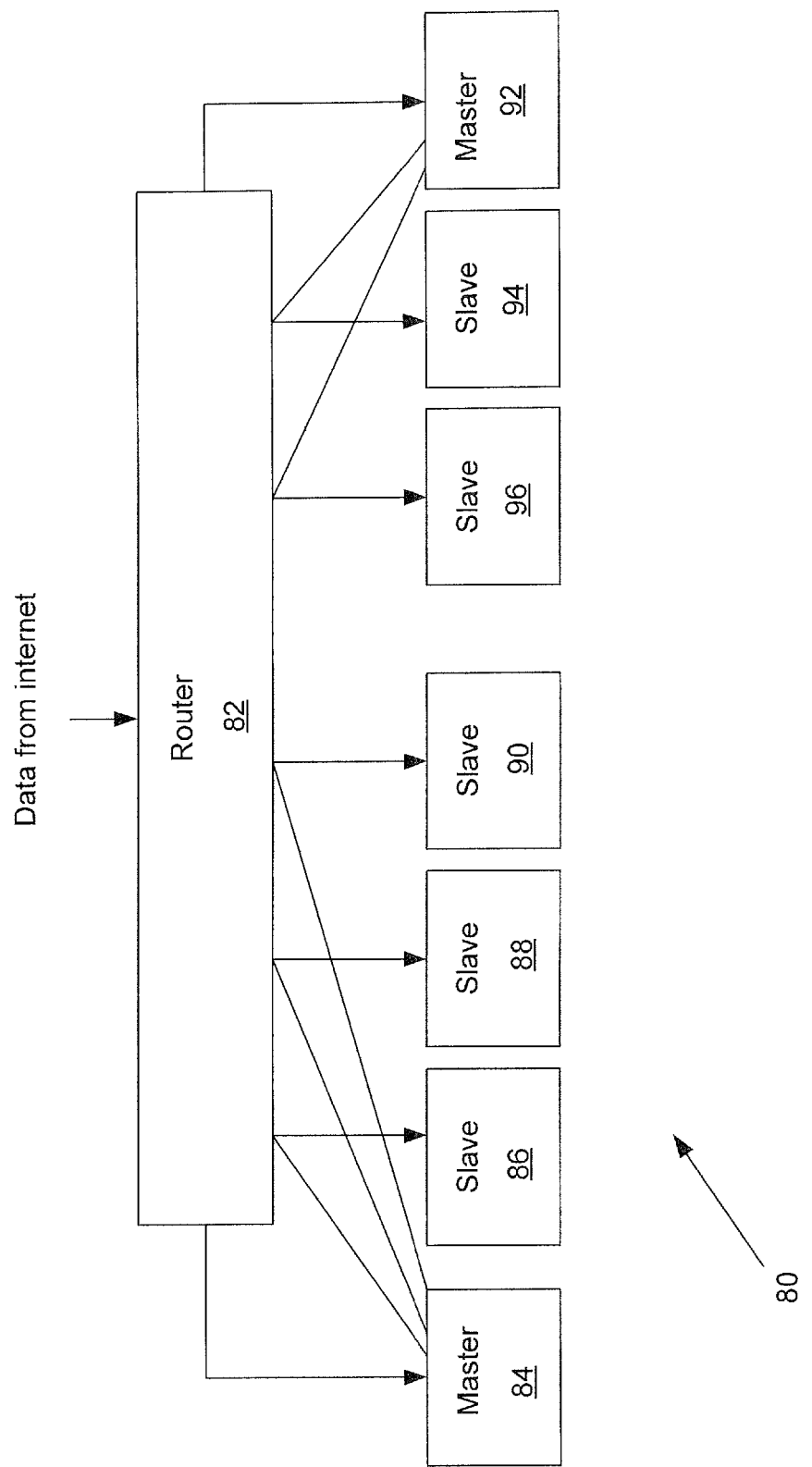
FIG. 3 illustrates a relationship among master and slave devices in an audio distribution system.

FIG. 3 schematically depicts system 80 in which, in part, audio data is routed from a master device to one or more slave devices. Audio data from the Internet is received by router 82 and routed to master audio playback device 84. Device 84 controls the distribution of the data to slaves 86, 88 and 90. The data moves from the master to each slave through router 82. When there is more than one slave served by the master, or in cases in which one or more additional slave devices are added to the network after the designation of the master, the bandwidth of the master can increase. This can lead to a decrease in the quality of audio data distribution in the network and thus it can decrease the quality of the audio output of the audio playback devices. These problems can be ameliorated by monitoring one or more network-related performance criteria of the master device. The criterion or criteria can be those of the types described above. If the monitored criterion of the master begins to suffer to an extent that might affect performance of the audio distribution system, the system can be enabled to designate a current slave device as a new, second master device.

Figure 4:
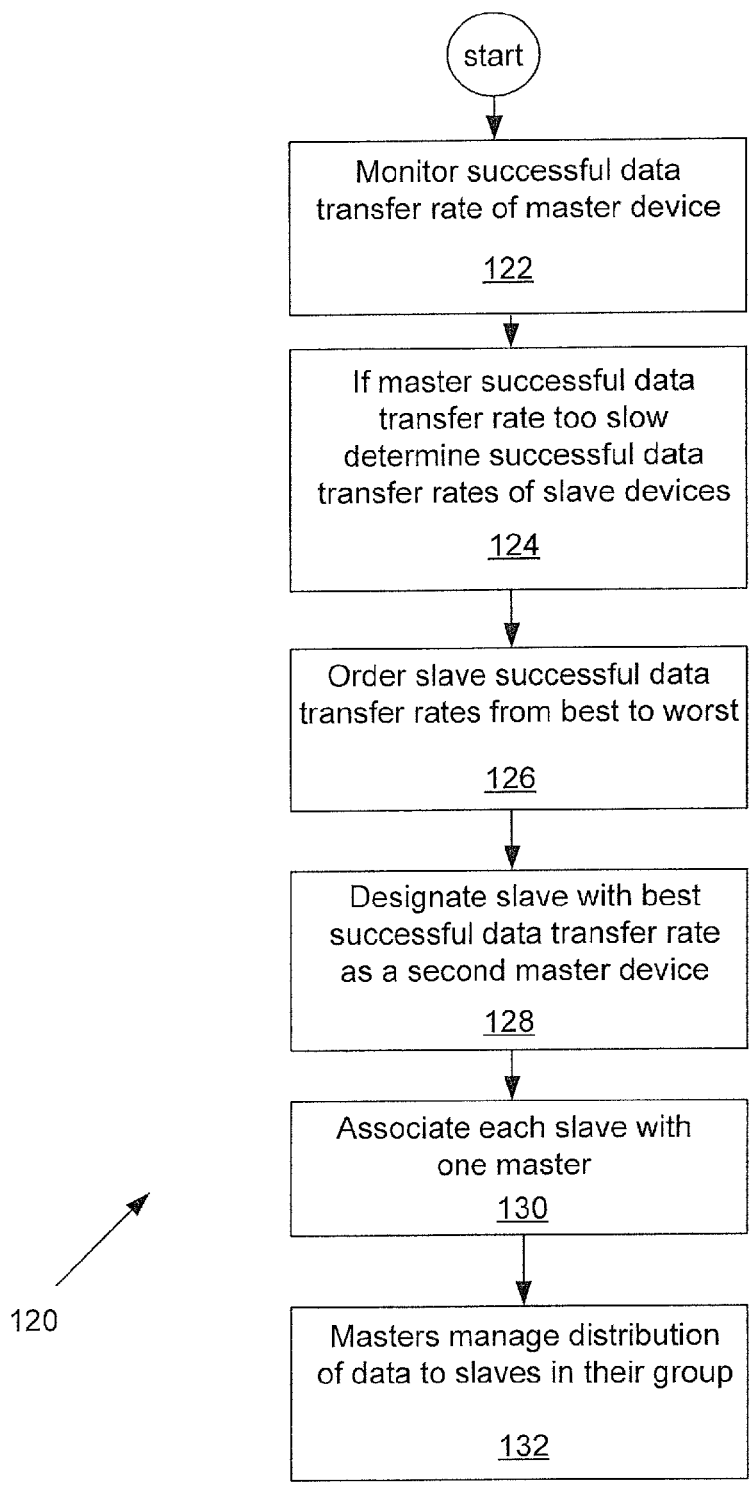
FIG. 4 illustrates a methodology by which a second slave device can be designated and used in the audio data distribution.

One methodology by which a second master device can be designated and used in the audio data distribution is illustrated by methodology 120, FIG. 4. The first step is to monitor the relevant network performance criterion of the master device, step 122. Such monitoring can be essentially continuous, or may be done periodically at a rate that is selected to be sufficient to capture likely problems given the network configuration. If the performance criterion of the master is insufficient (e.g., based on a predetermined threshold), the next step is to determine the performance criteria of the slave devices, step 124. These are ranked from best to worst, step 126. The slave device with the best performance is then designated as a second master device, step 128.

Now that there are two master devices, it is best to split the remaining slave devices among the two master devices in a manner which is designed to accomplish the best data distribution over the entire network. This is accomplished by associating each slave with one master, step 130. When there are two masters, there will be two groups of devices, each group having one master and one or more slaves. Each master manages the distribution of data to the slaves in its group, step 132. Each group, consisting of one master and one more slaves, can operate in the manner described above for one such group.

Turning back to FIG. 3, a second master 92 is shown. Like the first master 84, this new master receives the streamed audio from the cloud via router 82. As an alternative, the data can be received from a source on the local network. In the present example, the same data stream is provided to both of the masters. Second master 92 controls the distribution of the audio data, for example in a manner as described above, to its group of slaves comprising slave 94 and slave 96. As described above, the audio data stream can be pushed or pulled from master 92 to slaves 94 and 96.

It is likely best not to change the master on the fly (i.e., while the system is in use) because the very process of doing so may consume significant network resources and could even cause an audio dropout. But the system could have an effective short-term "Audio Dropout Detector" (e.g., in software) that, when it became active, would cause the system to inquire of other audio playback devices or clients to see if they might have substantially better network performance than the short-term performance of the current master device. If so, it would be best to promote the best performing slave to be the new master. The performance ratings of the slaves could be based both upon short-term performance and longer term average as already described above. One reason to do so is that if the master experiences a drop in performance it would not be advantageous to switch to a slave that drops to an equally low or lower performance level. The "Audio Dropout Detector" would likely need to trigger a threshold to initiate this action, one non-limiting example of a threshold being: at least "N" slaves have a combined audio dropout duration of greater than 5-10 seconds over the last 10 seconds.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for distributing audio data to multiple audio playback devices that are connected to a network, the method comprising:
    comparing one or more network-related performance criteria of a plurality of the audio playback devices;
    based on the comparison, designating one of the plurality of audio playback devices as a first active master device and the rest of the plurality of audio playback devices as slave devices, where the first active master device controls the distribution of audio data to the slave devices;
    monitoring a performance criterion of the first active master device and in response designating a slave device as a second active master device that controls the distribution of audio data to one or more other slave devices; and
    after designating a slave device as a second active master device, establishing data connections between each of the slave devices and one of the first and second active master devices. where each slave device is connected to only one master device, and where each master device controls the distribution of audio data only to the slave devices to which it is connected.

2. The method of claim 1 wherein the network-related performance criteria comprises the successful data transfer rates of the plurality of the audio playback devices.

3. The method of claim 2 wherein the successful data transfer rate comprises the network throughput achieved by an audio playback device.

4. The method of claim 2 wherein the successful data transfer rate is determined based on the physical data rate modified by the packet error rate.

5. The method of claim 2 wherein the successful data transfer rate is determined in part based on the data transmission error rate.

6. The method of claim 5 wherein the successful data transfer rate is determined in part based on the standard deviation of the data transmission error rate.

7. The method of claim 2 wherein the comparison is based at least in part on the successful data communication rates over a predetermined time period.

8. The method of claim 7 wherein the data communication rate comprises the running average of the successful data transfer rate achieved by an audio playback device over the predetermined time period.

9. The method of claim 1 where the audio data originates from an audio source, and wherein the method further comprises establishing a data connection between each of the master devices and the audio source.

10. The method of claim 9 wherein the audio data passes through a router that is in the data connection between the audio source and each master, and wherein each master distributes data it has received from the audio source to its connected slave devices, through the router.

11. The method of claim 1 wherein each audio playback device comprises a computer memory and wherein the method further comprises storing in the memory of each audio playback device an identification of each master device and each slave device.

12. The method of claim 1 wherein monitoring a performance criterion of the first active master device comprises determining the successful data transfer rate achieved by the first active master device.

13. The method of claim 12 wherein the successful data transfer rate is determined based on the physical data rate modified by the packet error rate.

14. A computer device configured to control the distribution of audio data to audio playback devices that are connected to a network, comprising:
    a memory; and
    a processor communicatively coupled to the memory and that is configured to:
        compare one or more network-related performance criteria of a plurality of the audio playback devices;
        based on the comparison, designate one of the plurality of audio playback devices as a first active master device and the rest of the plurality of audio playback devices as slave devices, where the first active master device controls the distribution of audio data to the slave devices;
        cause an identification of the first active master device and the slave devices to be stored in the memory;
        monitor a performance criterion of the first active master device and in response designate a slave device as a second active master device that controls the distribution of audio data to one or more other slave devices; and
        after designating a slave device as a second active master device, establish data connections between each of the slave devices and one of the first and second active master devices, where each slave device is connected to only one master device, and where each master device controls the distribution of audio data only to the slave devices to which it is connected.

15. The device of claim 14 wherein the network-related performance criteria comprises the successful data communication rates of the plurality of the audio playback devices.

16. The device of claim 15 wherein the successful data communication rate comprises the network throughput achieved by an audio playback device.

17. The device of claim 15 wherein the successful data communication rate comprises the running average of the successful data transfer rate achieved by an audio playback device over the predetermined time period.

18. The computer device of claim 14 wherein the audio data originates from an audio source, and wherein a data connection is established between each of the master devices and the audio source through a router, and wherein each master device distributes data it has received from the audio source to its connected slave devices, through the router.

\* \* \* \* \*